Figure 1:
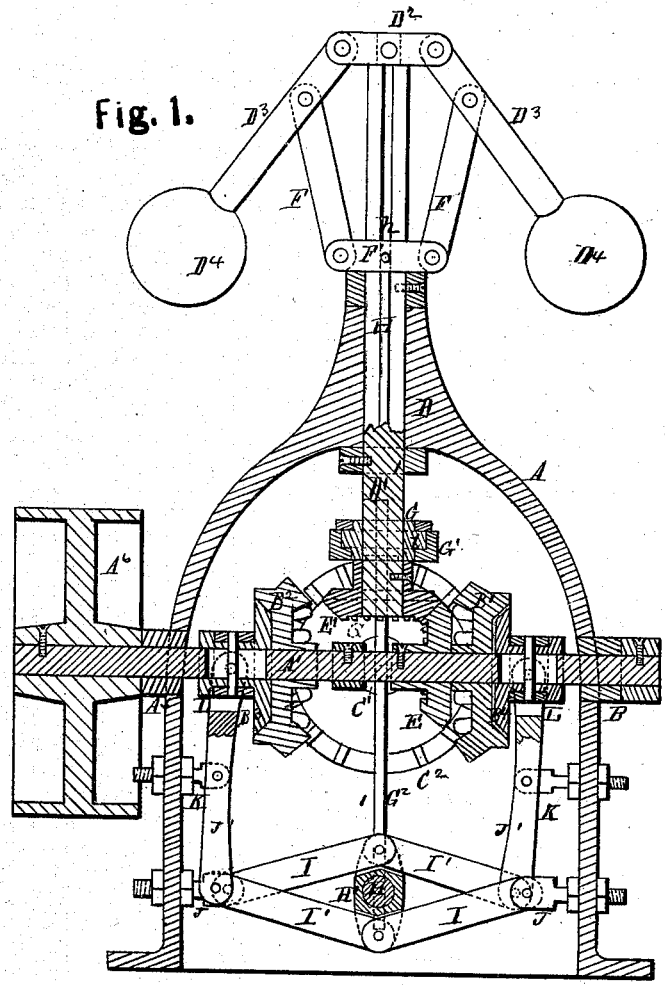

W. M. BAILEY.
Improvement in Governors for Water-Wheels, &c.

No. 129,707.            Patented July 23, 1872.

WITNESSES.            INVENTOR.

UNITED STATES PATENT OFFICE.

WALTER M. BAILEY, OF MATTEAWAN, NEW YORK.

IMPROVEMENT IN GOVERNORS FOR WATER-WHEELS, &c.

Specification forming part of Letters Patent No. 129,707, dated July 23, 1872.

*To all whom it may concern:*

Be it known that I, WALTER M. BAILEY, of Matteawan, in the county of Dutchess and State of New York, have invented a new and valuable Improvement in Water-Wheel Governor; and I do hereby declare that the following is a full, clear, and exact description of the construction and operation of the same, reference being had to the annexed drawing making a part of this specification, and to the letters and figures of reference marked thereon.

Figure 1 of the drawing is a representation of a vertical section of my invention.

My invention has relation to water-wheel governors; and consists in the construction and novel arrangement of certain devices, which are actuated by the motion of the wheel, and so organized as to control the speed of the wheel by regulating the positions of the wheel-gates to the conditions of speed, the latter depending on the flow of water through the gate-ways, all as hereinafter described.

Referring to the accompanying drawing, A represents a dome-like case, constructed with the three horizontal bearings $A^5$ B C and the vertical bearing D. The bearings $A^5$ B receive a horizontal shaft, $A^1$, holding a pulley or belt wheel, $A^6$, and driven by a belt connected with the shaft of the wheel. The shaft $A^1$ also holds two loose bevel-gear wheels, $B^1$ $B^2$, which are held in place and prevented from sliding lengthwise of the shaft by means of grooves around the shaft, into which set-screws from the wheel-collars enter. These wheels have conical recesses formed in their back parts to receive conical or beveled friction-gears $B^3$ $B^4$, which are also on the shaft $A^1$, but which are so keyed to the shaft by means of a stud on each entering a longitudinal groove in the shaft that they are made to turn with said shaft, while being allowed to slide along it under proper control. When, by moving said friction-gears, they are brought into suitable contact with the wheels $B^1$ $B^2$, said wheels are also compelled to rotate with the shaft $A^1$. These wheels are at all times in connection with a bevel-gear wheel, $C^2$, on the end of a shaft, $C^1$, turning in the bearing C, and so connected to the gates of a water-wheel that the turning of said shaft in one direction will tend to open the gates, while the turning of it in the reverse direction will tend to close them. E designates a bevel-toothed gear-wheel rigidly secured to the shaft $A^1$, and engaging with one, E′, similar to it, secured rigidly to the lower end of a vertical shaft, $D^1$, having its bearing in the part D of the case A. Upon the upper end of the shaft $D^1$ is a cross-head, $D^2$, to which is hinged two arms, $D^3$, holding the governor-balls $D^4$. Pivoted links F connect the arms $D^3$ to a sliding collar, F′, on the shaft $D^1$. According as the balls rise and fall through centrifugal force or attraction of gravitation, resulting from the variation in the speed of the shaft $D^1$, the collar F′ also rises and falls. By means of the gearing E E′ the speed of the shaft $A^1$ is communicated to the shaft $D^1$. G $G^1$ represent, respectively, a male and female collar placed on the shaft $D^1$, the former within the latter, and turning with the shaft and independently of the collar $G^1$. The collar G is connected to the shaft and the collar F′ by means of two vertical rods, H, arranged within longitudinal grooves $h$ in the shaft. When the collar F′ rises and falls, the collars G $G^1$, the former supporting the latter by means of its flange $i$, also rise and fall. The collar $G^1$ is, by means of adjustable rods $G^2$, connected to a transverse bar, H, below the shaft $A^1$, and passing through a block, H′. To either of the ends of this block are attached the toggle-arms I I′. The arms I I are each pivoted to a stud, J, projecting from the side of the case A, and the arms I′ I′ each pivoted to a lever, J′, having its fulcrum on a stud, K, projecting also from the case A above the studs J. The levers J′ are constructed with yokes L, and are pivoted thereby to the collars of the friction-gears $B^3$ $B^4$.

Now, should the water-wheel be running at too high a rate of speed, the governor-balls will be thrown out, and by means of the connecting mechanism already described the block H′ will be raised, the wheel $B^3$ brought in contact with the wheel $B^1$, and the wheel $B^4$ at the same time moved away from the wheel $B^2$. The wheel $B^4$ will now follow the motion of the shaft $A^1$ and govern the movement of the wheel $C^2$ and also the movement of the shaft $C^1$, the result of which will be the closing or partial closing of the gates of the water-wheel. Should the wheel be running at too low a speed the reverse actuation of parts will follow throughout. When the water-wheel is running at the proper rate, both of the friction-gears are free from the wheels B¹ B², allowing the latter to turn loosely on the shaft A¹.

What I claim as my invention, and desire to secure by Letters Patent, is—

1. The toggles I I', fixed bearings J, and levers J', in combination with the governor attachments and gearing and the shafts A¹ C, substantially as and for the purpose specified.

2. The toggles I I', levers J', and conical friction-gears B³ B⁴, in combination with the governor attachments D² D³ D⁴, recessed gear-wheels B¹ B², shafts A¹ C, and gear-wheel C², substantially as specified.

In testimony that I claim the above I have hereunto subscribed my name in the presence of two witnesses.

WALTER MILLARD BAILEY.

Witnesses:
WM. H. BUTLER, Jr.,
N. H. WESTBURGH.